United States Patent
Deliz Centeno et al.

(10) Patent No.: US 12,366,917 B1
(45) Date of Patent: Jul. 22, 2025

(54) MODIFYING DISPLAY OF CONTENT BASED ON GAZE AND HEAD MOVEMENT

(71) Applicant: Apple Inc., Cupertino, CA (US)

(72) Inventors: Luis R. Deliz Centeno, Fremont, CA (US); Gregory Lutter, Boulder Creek, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/241,671

(22) Filed: Sep. 1, 2023

Related U.S. Application Data

(60) Provisional application No. 63/409,261, filed on Sep. 23, 2022.

(51) Int. Cl.
*G06F 3/01* (2006.01)
*G06T 19/00* (2011.01)

(52) U.S. Cl.
CPC .............. *G06F 3/013* (2013.01); *G06F 3/012* (2013.01); *G06T 19/00* (2013.01); *G06T 2210/62* (2013.01)

(58) Field of Classification Search
CPC ........ G06F 3/013; G06F 3/012; G06F 3/0482; G06F 3/04815; G06T 19/00; G06T 2210/62; G06T 7/75; G06V 40/10; G09G 3/002; A61B 5/0533; A63F 13/213
USPC ............................ 345/156; 382/104; 715/852
See application file for complete search history.

(56) References Cited

U.S. PATENT DOCUMENTS

| | | | |
|---|---|---|---|
| 2015/0007114 A1* | 1/2015 | Poulos ................. | G06F 3/0482 715/852 |
| 2015/0156803 A1* | 6/2015 | Ballard ................ | H04N 23/635 455/422.1 |
| 2015/0212576 A1* | 7/2015 | Ambrus ................ | G06F 3/0482 345/156 |
| 2016/0282937 A1* | 9/2016 | Thorn ....................... | G06T 7/75 |
| 2019/0087000 A1* | 3/2019 | Ricknäs ................. | G06F 3/013 |

(Continued)

OTHER PUBLICATIONS

Kazuyo Iwamoto et al., "An Eye Movement Tracking Type Head Mounted Display for Virtual Reality System: —Evaluation Experiments of a Proto-type System—," In Proceedings of IEEE International Conference on Systems, Man and Cybernetics (vol. 1, pp. 13-18). IEEE.

(Continued)

*Primary Examiner* — Abdul-Samad A Adediran
(74) *Attorney, Agent, or Firm* — Fernando & Partners, LLP

(57) ABSTRACT

Various implementations disclosed herein include devices, systems, and methods for modifying display of virtual content. In some implementations, the method is performed by an electronic device including a non-transitory memory, one or more processors, a display, an eye tracker and a movement sensor. In some implementations, the method includes displaying, via the display, virtual content. In some implementations, the method includes detecting, via the eye tracker, a movement of a gaze in a first direction. In some implementations, the method includes detecting, via the movement sensor, a movement of a head in a second direction while detecting the movement of the gaze in the first direction. In some implementations, the method includes, in accordance with a determination that the movement of the gaze in the first direction and the movement of the head in the second direction are corresponding opposing movements, modifying a display characteristic of the virtual content.

20 Claims, 7 Drawing Sheets

(56) References Cited

U.S. PATENT DOCUMENTS

| | | |
|---|---|---|
| 2019/0107720 A1 | 4/2019 | Palacios et al. |
| 2019/0333480 A1 | 10/2019 | Lang |
| 2021/0357026 A1 | 11/2021 | Monti et al. |
| 2022/0091722 A1* | 3/2022 | Faulkner ............. G06F 3/04815 |
| 2022/0092862 A1* | 3/2022 | Faulkner ............... G06V 40/10 |
| 2022/0101593 A1* | 3/2022 | Rockel ................. A63F 13/213 |
| 2022/0198971 A1* | 6/2022 | Schmid .................. G09G 3/002 |
| 2022/0236798 A1* | 7/2022 | Kimura ................... G06F 3/013 |
| 2023/0106673 A1* | 4/2023 | Asghar ............... A61B 5/0533 |
| | | 382/104 |

OTHER PUBLICATIONS

Kazuyo Iwamoto et al., "High Resolution, Wide View Angle Head Mounted Display Using Eye Movement Tracking:—System Structure and Evaluation Experiments—," In Proceedings 4th IEEE International Workshop on Robot and Human Communication (pp. 289-294). IEEE.

* cited by examiner

MODIFYING DISPLAY OF CONTENT BASED ON GAZE AND HEAD MOVEMENT

CROSS-REFERENCE TO RELATED APPLICATION

This application claims the benefit of U.S. Provisional Patent App. No. 63/409,261, filed on Sep. 23, 2022, which is incorporated by reference in its entirety.

TECHNICAL FIELD

The present disclosure generally relates to modifying display of content based on gaze and head movement.

BACKGROUND

Some devices include a display that presents content. The presentation of content can sometimes interfere with the user's ability to view objects in a physical environment. As such, the presentation of content may sometimes need to be modified.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1A:
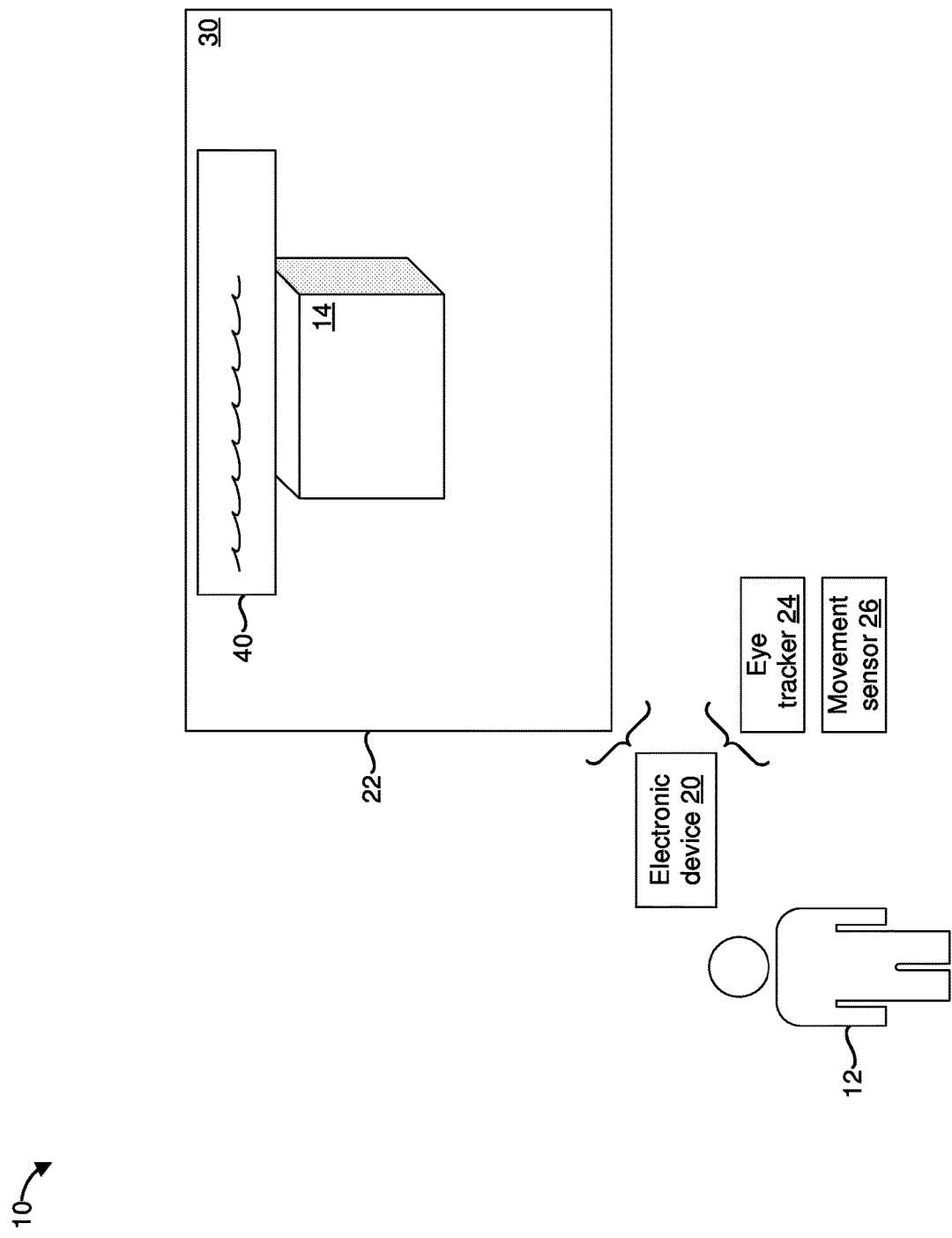
FIGS. 1A-1D are diagrams of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for modifying display of virtual content. In some implementations, the method is performed by an electronic device including a non-transitory memory, one or more processors, a display, an eye tracker and a movement sensor. In some implementations, the method includes displaying, via the display, virtual content. In some implementations, the method includes detecting, via the eye tracker, a movement of a gaze in a first direction. In some implementations, the method includes detecting, via the movement sensor, a movement of a head in a second direction while detecting the movement of the gaze in the first direction. In some implementations, the method includes, in accordance with a determination that the movement of the gaze in the first direction and the movement of the head in the second direction are corresponding opposing movements, modifying a display characteristic of the virtual content.

In accordance with some implementations, a device includes one or more processors, a plurality of sensors, a non-transitory memory, and one or more programs. In some implementations, the one or more programs are stored in the non-transitory memory and are executed by the one or more processors. In some implementations, the one or more programs include instructions for performing or causing performance of any of the methods described herein. In accordance with some implementations, a non-transitory computer readable storage medium has stored therein instructions that, when executed by one or more processors of a device, cause the device to perform or cause performance of any of the methods described herein. In accordance with some implementations, a device includes one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Some devices present virtual content via a display. Some devices overlay the virtual content onto a three-dimensional (3D) environment (e.g., an extended reality (XR) environment, for example, an optical or video pass-through of a physical environment, or a virtual environment). When a device overlays the virtual content on top of a 3D environment (e.g., a virtual environment, or an optical or video pass-through of a physical environment), the presentation of the virtual content can sometimes interfere with the user's ability to view an XR object (e.g., a representation of a physical article, a body-locked virtual object, or a world-locked virtual object). For example, the virtual content can sometimes obstruct a view of the physical article when the virtual content is overlaid on top of an optical or video pass-through representation of the physical article. As such, the presentation of the virtual content may sometimes need to be modified.

The present disclosure provides methods, systems, and/or devices for modifying presentation of virtual content. A device modifies the presentation of virtual content so that the virtual content does not interfere with a user's ability to view an object (e.g., an XR object, for example, a representation of a physical article in a physical environment of the device, or a body-locked or world-locked virtual object in the XR environment). While presenting virtual content on a display, the device utilizes eye tracking data and head pose data to determine that a gaze of the user is fixated on a portion of the 3D environment (e.g., on a portion of a physical environment or an XR environment). For example, if the presentation of the virtual content obstructs a view of an object (e.g., a physical article or a virtual object) that the gaze of the user is fixated on, the device can modify a display characteristic of the virtual content in order to reduce an interference of the virtual content with the user's ability to view the object (e.g., so that the user can view the physical article or the body-locked/world-locked virtual object).

The device may utilize the eye tracking data to detect a movement of a gaze of the user in a first direction. Additionally, the device may utilize the head pose data to detect a movement of a head of the user in a second direction while detecting the movement of the gaze in the first direction. When the gaze and the head are moving in opposite directions and by corresponding amounts, the device can determine that the gaze is fixated on a particular portion of a 3D environment (e.g., on a portion of a physical or an XR environment). As such, virtual content that obstructs a view of that particular portion of the 3D environment may need to be modified so as to allow the user to view that particular portion of the 3D environment. For example, the device detects whether the gaze is moving upward while the head is moving downward. In this example, virtual content displayed towards a top of the display may interfere with the user's ability to view a portion of the 3D environment that the user is fixating on. Continuing with this example, the device may increase a transparency of the virtual content or cease displaying the virtual content in order to provide an unobstructed view of the portion of the 3D environment that the user is fixating on.

The device can modify the display characteristic of the virtual content by increasing a transparency of the virtual content so that the virtual content does not completely obstruct a view of an object that the gaze is fixated on (e.g., the physical article or the virtual object that the gaze is fixated on). Additionally or alternatively, the device can modify the display characteristic of the virtual content by ceasing to display the virtual content while the gaze of the user is fixated on the object so that the virtual content does not obstruct a view of the object. The device can restore the presentation of the virtual content when the device determines that the gaze of the user is no longer fixated on the object and the device determines that reverting the display characteristic of the virtual content would not interfere with the user's ability to view a portion of the 3D environment that the user is interested in viewing.

FIG. 1A is a diagram that illustrates an example physical environment 10 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the physical environment 10 includes a user 12 and an electronic device 20.

In some implementations, the electronic device 20 includes a handheld computing device that can be held by the user 12. For example, in some implementations, the electronic device 20 includes a smartphone, a tablet, a media player, a laptop, or the like. In some implementations, the electronic device 20 includes a wearable computing device that can be worn by the user 12. For example, in some implementations, the electronic device 20 includes a head-mountable device (HMD) or an electronic watch. In various implementations, the electronic device 20 includes a display 22, an eye tracker 24 and a movement sensor 26. In some implementations, the eye tracker 24 tracks a movement of an eye of the user 12. For example, the eye tracker 24 generates a three-dimensional (3D) gaze vector that indicates a gaze direction, a gaze position and/or a gaze intensity. In some implementations, the movement sensor 26 tracks a movement of a portion of a body of the user 12. For example, the movement sensor 26 generates head pose data that indicates a movement of a head of the user 12.

In the example of FIG. 1A, the display 22 presents an extended reality (XR) environment 30. In some implementations, the XR environment 30 includes an optical or video pass-through of the physical environment 10. In some implementations, the display 22 includes an opaque display and the XR environment 30 includes a video pass-through of the physical environment 10. For example, a camera of the electronic device 20 captures an image of the physical environment 10, and the display 22 displays the image captured by the camera. Alternatively, in some implementations, the display 22 includes an optical see-through display and the XR environment 30 includes an optical see-through of the physical environment 10. For example, light from the physical environment 10 enters an eye of the user 12 through the optical see-through display. In some implementations, the XR environment 30 includes a virtual environment that does not correspond to (e.g., does not resemble) the physical environment 10. For example, the XR environment 30 may be an entirely synthetic environment (e.g., a fictional environment).

In various implementations, the XR environment 30 includes a set of one or more XR objects. In the example of FIG. 1A, the XR environment 30 includes an XR object 14. In some implementations, the XR object 14 is a representation of a physical article in the physical environment 10. For example, the XR object 14 may correspond to an optical or a video pass-through of the physical article.

In some implementations, the XR object 14 includes a virtual object. In some implementations, the XR object 14 includes a body-locked virtual object that is locked to a portion of a body of the user 12. For example, the electronic device 20 may include an HMD that maintains display of the body-locked virtual object at a particular distance (e.g., depth) from the portion of the body of the user 12 and at a particular angular offset with respect to the portion of the body of the user 12. For example, the XR object 14 may include a virtual clock object that is body-locked at one meter away from the torso of the user 12 and at 45 degrees left of the center of the torso. Initially, the HMD, worn by the user 12, displays the virtual clock object on the display 22 so as to appear to be one meter away from the torso, at 45 degrees left of the center of the torso. Continuing with this example, the head of the user 12 and the HMD turn leftward simultaneously while the torso is stationary, and the HMD detects the leftwards rotation (e.g., via an IMU). In response to detecting the leftwards rotation, the HMD correspondingly moves the virtual clock object rightwards on the display 22 in order to maintain the virtual clock object at 45 degrees left of the center of the torso. Accordingly, the position of the XR object 14 on the display 22 may change based on a rotational change of the HMD. As another example, in response to detecting a translational movement (e.g., the user 12 walks to a different room in a house), the HMD maintains the XR object 14 at the particular distance from the portion of the body of the user 12 and at the particular angular offset with respect to the portion of the body of the user 12. Accordingly, the HMD may display the XR object 14 on the display 22 such that the XR object 14 appears to follow the HMD based on a translational movement of the HMD.

In some implementations, the electronic device 20 maintains display of the XR object 14 at a particular distance from a portion of the body of the user 12. However, an orientation of the XR object 14 may remain static relative to the user 12. For example, if the XR object 14 is displayed in a cardinal direction, the XR object 14 remains in that cardinal direction regardless of head and/or body movement of the user 12. As such, the orientation of the XR object 14 may not be referenced to a portion of the body of the user 12. As an example, the head of the user 12 and the HMD turn leftwards while the torso is stationary, and the HMD detects the leftwards rotation (e.g., via an IMU). In response to detecting the leftwards rotation, the HMD correspondingly moves the XR object 14 rightwards on the display 22 in order to maintain the XR object 14 at the same orientation. When the user 12 rotates his/her torso, the electronic device 20 does not reposition the XR object 14 in order to maintain an angular position of the XR object 14 with respect to the torso. For example, the XR object 14 may initially be positioned 5 m away from the user 12 based on a direction that the user 12 is initially facing (e.g., North). In this example, if the user 12 rotates his/her torso by 180° (e.g., to face South), the XR object 14 would no longer be displayed because the XR object 14 would remain 5 m away from the user in the initial direction that the user 12 was facing (e.g., the XR object 14 would be 5 m away in the North direction which is directly behind the user 12). In some implementations, the electronic device 20 configures the XR object 14 to remain aligned with gravity or a horizon such that head and/or body changes in a roll orientation do not trigger a movement of the XR object 14 within the XR environment 30.

In some implementations, the XR object 14 includes a world-locked object that is locked to a volumetric region or a specific point of the physical environment 10. Accordingly, the XR object 14 is displayed when a viewable region associated with the display 22 includes the volumetric region or the specific point. In response to a positional change of the electronic device 20, the appearance of the XR object 14 changes. For example, in response to a rotation of the electronic device 20, the XR object 14 moves to a different location on the display 22 or ceases to be displayed. As another example, as the electronic devices 20 moves towards the XR object 14, the XR object 14 appears larger. Although at a given time the XR object 14 is locked to a volumetric region, the volumetric region may be changed. For example, based on one or more user inputs, the electronic device 20 selects and moves a computer-generated couch to a different location within a living room.

When the XR environment 30 includes a pass-through of the physical environment 10, the XR environment 30 may include pass-through representations of physical articles that are in the physical environment 10. The pass-through representations of physical articles may be referred to as XR objects. For example, the XR environment 30 may be an optical or video pass-through of the physical environment 10 and the XR object 14 may be a pass-through representation of a physical article such as a physical couch, a physical painting, a physical dog, etc.

In various implementations, the XR environment 30 includes virtual content 40. In the example of FIG. 1A, the virtual content 40 is overlaid onto the XR object 14. As such, the virtual content 40 obstructs a view of the XR object 14. If the virtual content 40 obstructs a view of at least a portion of the XR object 14, the user 12 cannot view an entirety of the XR object 14 while viewing the XR environment 30. The virtual content 40 may include text, a graphic, an image, a video, a graphical object, a user interface element (e.g., a button, a notification, etc.), or the like.

In some implementations, the virtual content 40 includes a display-locked object (sometimes referred to as a "head-locked object") that is locked to a particular position of the display 22. For example, the virtual content 40 may include a display-locked object that corresponds to a heads-up display (HUD) that is display-locked to slightly below a top edge of the display 22. Accordingly, in response to a positional change (e.g., a rotation or translational movement) of the electronic device 20, the electronic device 20 maintains display of the virtual content 40 at the particular position of the display 22. In contrast to a world-locked object, the position of the display-locked object is independent of the physical environment 10 that is associated with the electronic device 20. Although at a given time the displayed-locked object is locked to a particular position of the display 22, the particular position may be changed. For example, in response to receiving a user input, the electronic device 20 can move the virtual content 40 from being locked near a top edge of the display 22 to being locked to a bottom edge of the display 22.

In some implementations, the virtual content 40 includes a body-locked object that is locked to a portion of a body of the user 12. For example, the electronic device 20 may include an HMD that maintains display of the body-locked object at a particular distance (e.g., depth) from the portion of the body of the user 12 and at a particular angular offset with respect to the portion of the body of the user 12. For example, a timer widget is body-locked at one meter away from the torso of the user 12 and at 45 degrees left of the center of the torso. Initially, the HMD, worn by the user 12, displays the timer widget on the display 22 so as to appear to be one meter away from the torso, at 45 degrees left of the center of the torso. Continuing with this example, the head of the user 12 and the HMD turn leftward simultaneously while the torso is stationary, and the HMD detects the leftwards rotation (e.g., via an IMU). In response to detecting the leftwards rotation, the HMD correspondingly moves the timer widget rightwards on the display 22 in order to maintain the timer widget at 45 degrees left of the center of the torso. Accordingly, in contrast to a display-locked object, the position of the body-locked object on the display 22 may change based on a rotational change of the HMD. As another example, in response to detecting a translational movement (e.g., the user 12 walks to a different room in a house), the HMD maintains the body-locked object at the particular distance from the portion of the body of the user 12 and at the particular angular offset with respect to the portion of the body of the user 12. Accordingly, in contrast to a world-locked object, the HMD displays the body-locked object on the display 22 such that the body-locked object appears to follow the HMD based on a translational movement of the HMD.

In some implementations, the electronic device 20 maintains display of the body-locked object at a particular distance from a portion of the body of the user 12. However, an orientation of the body-locked object may remain static relative to the user 12. For example, if the body-locked object is displayed in a cardinal direction, the body-locked object remains in that cardinal direction regardless of head and/or body movement of the user 12. As such, the orientation of the body-locked object may not be referenced to a portion of the body of the user 12. As an example, the head of the user 12 and the HMD turn leftwards while the torso is stationary, and the HMD detects the leftwards rotation (e.g., via an IMU). In response to detecting the leftwards rotation, the HMD correspondingly moves the timer widget rightwards on the display 22 in order to maintain the timer widget at the same orientation. When the user 12 rotates his/her torso, the electronic device 20 does not reposition the body-locked object in order to maintain an angular position of the body-locked object with respect to the torso. For example, the body-locked object may initially be positioned 5 m away from the user 12 based on a direction that the user 12 is initially facing (e.g., North). In this example, if the user 12 rotates his/her torso by 180° (e.g., to face South), the body-locked object would no longer be displayed because the body-locked object would remain 5 m away from the user in the initial direction that the user 12 was facing (e.g., the body-locked object would be 5 m away in the North direction which is directly behind the user 12). In some implementations, the electronic device 20 configures the body-locked object to remain aligned with gravity or a horizon such that head and/or body changes in a roll orientation do not trigger a movement of the body-locked object within the XR environment 30.

In some implementations, the virtual content 40 includes a world-locked object that is locked to a volumetric region or a specific point of the physical environment 10. Accordingly, the world-locked object is displayed when a viewable region associated with the display 22 includes the volumetric region or the specific point. In response to a positional change of the electronic device 20, the appearance of the world-locked object changes. For example, in response to a rotation of the electronic device 20, the world-locked object moves to a different location on the display 22 or ceases to be displayed. As another example, as the electronic devices 20 moves towards the world-locked object, the world-locked object appears larger. Although at a given time the world-locked object is locked to a volumetric region, the volumetric region may be changed. For example, based on one or more user inputs, the electronic device 20 selects and moves a computer-generated couch to a different location within a living room.

Figure 1B:
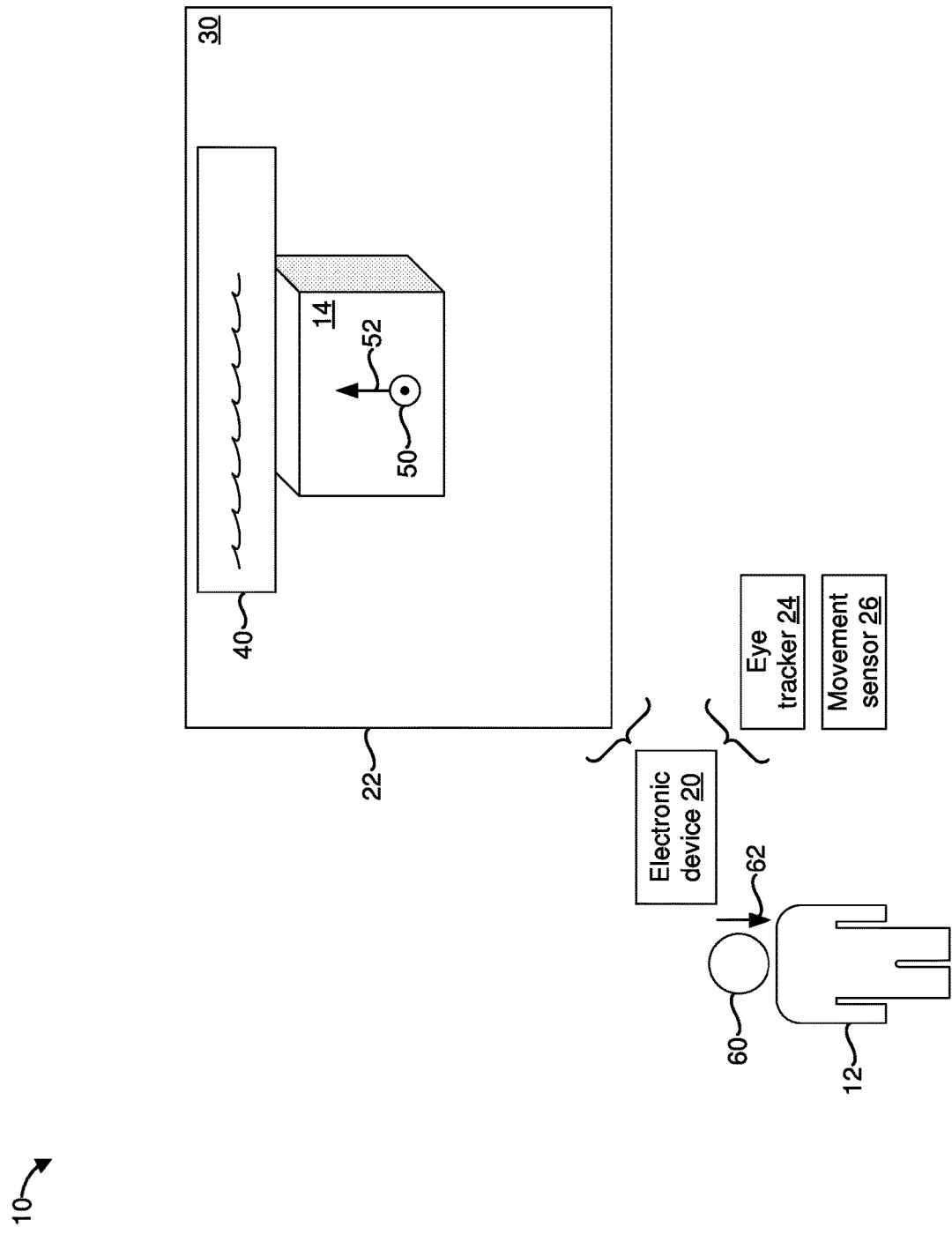
Figure 1C:
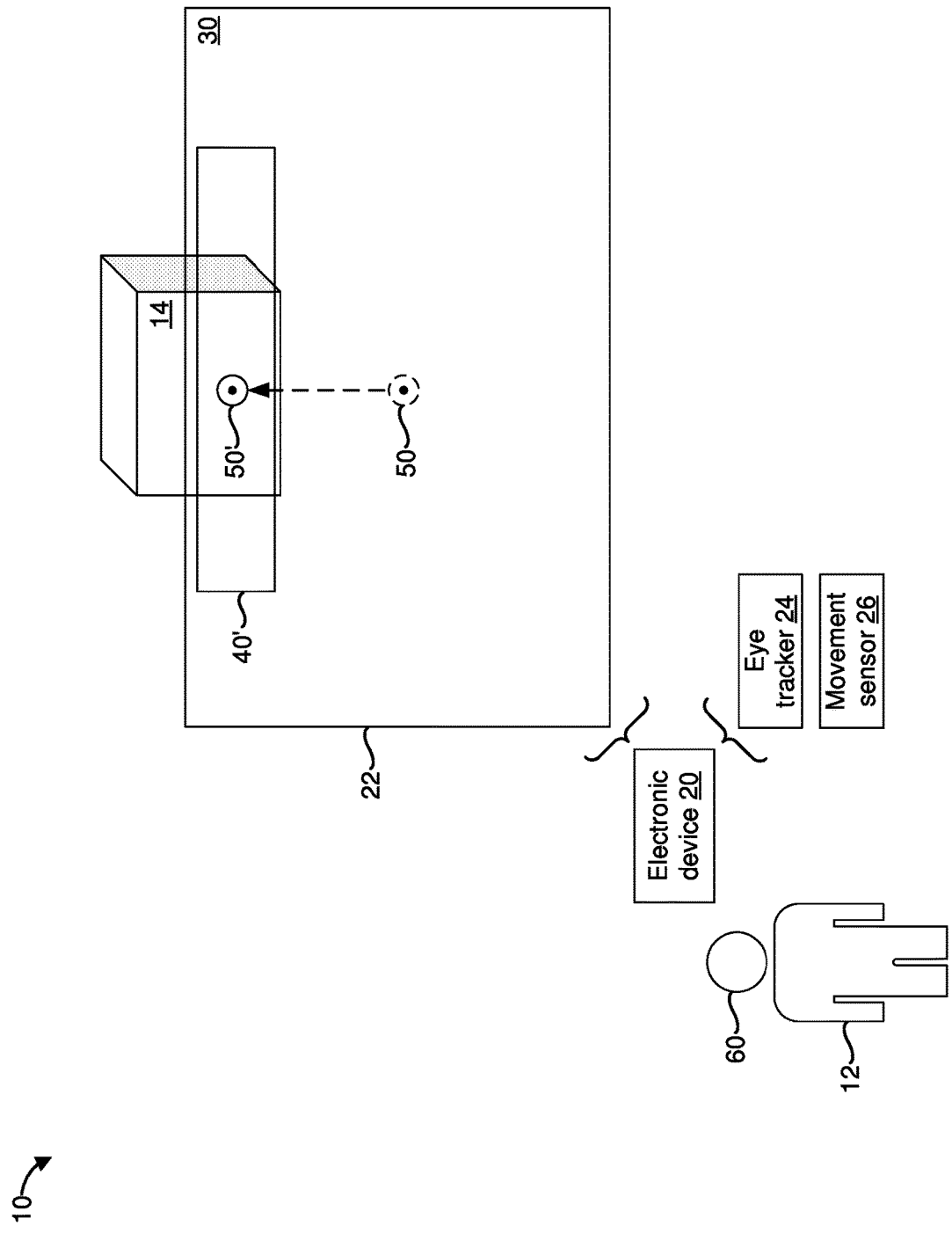

Referring to FIG. 1B, in various implementations, the electronic device 20 determines whether the user 12 is interested in viewing the XR object 14 that may at times be obstructed by the virtual content 40 (e.g., as shown in FIG. 1C). In some implementations, the electronic device 20 utilizes eye tracking data generated by the eye tracker 24 and head pose data generated by the movement sensor 26 to determine whether the user 12 is interested in viewing the XR object 14 that may at times be obstructed by the virtual content 40. In the example of FIG. 1B, the eye tracker 24 indicates a gaze position 50 and a movement of the gaze in a first direction 52 (e.g., upwards towards the virtual content 40). Moreover, the movement sensor 26 indicates a movement of a head 60 of the user 12 in a second direction 62 (e.g., downwards away from the virtual content 40) that is opposite from the first direction 52. In some implementations, concurrent opposing movements of the gaze and the head 60 by corresponding amounts (e.g., the same angular displacement or angular displacements within an error threshold) indicate that the user 12 is fixated on a portion of the XR environment 30 (e.g., on a portion of the physical environment 10 that is represented in the XR environment 30). For example, opposing movements of the gaze and the head 60 may indicate that the user 12 is trying to focus on the XR object 14 instead of the virtual content 40.

FIG. 1C illustrates a new gaze position 50' as a result of the gaze moving in an upward direction. Also shown is a new position of the XR object 14 with respect to the display 22 as a result of the downward movement of the head 60 of the user 12. In various implementations, the electronic device 20 modifies a display characteristic of the virtual content 40 (shown in FIG. 1B) in order to generate and display modified virtual content 40'. In some implementations, the electronic device 20 modifies the display characteristic of the virtual content 40 by increasing a transparency of the virtual content 40 in order to generate a more transparent modified virtual content 40' that does not completely obstruct a view of the XR object 14. As can be seen in FIG. 1C, an entirety of the XR object 14 is visible to the user 12 through the display 22 of the electronic device 20.

Figure 1D:
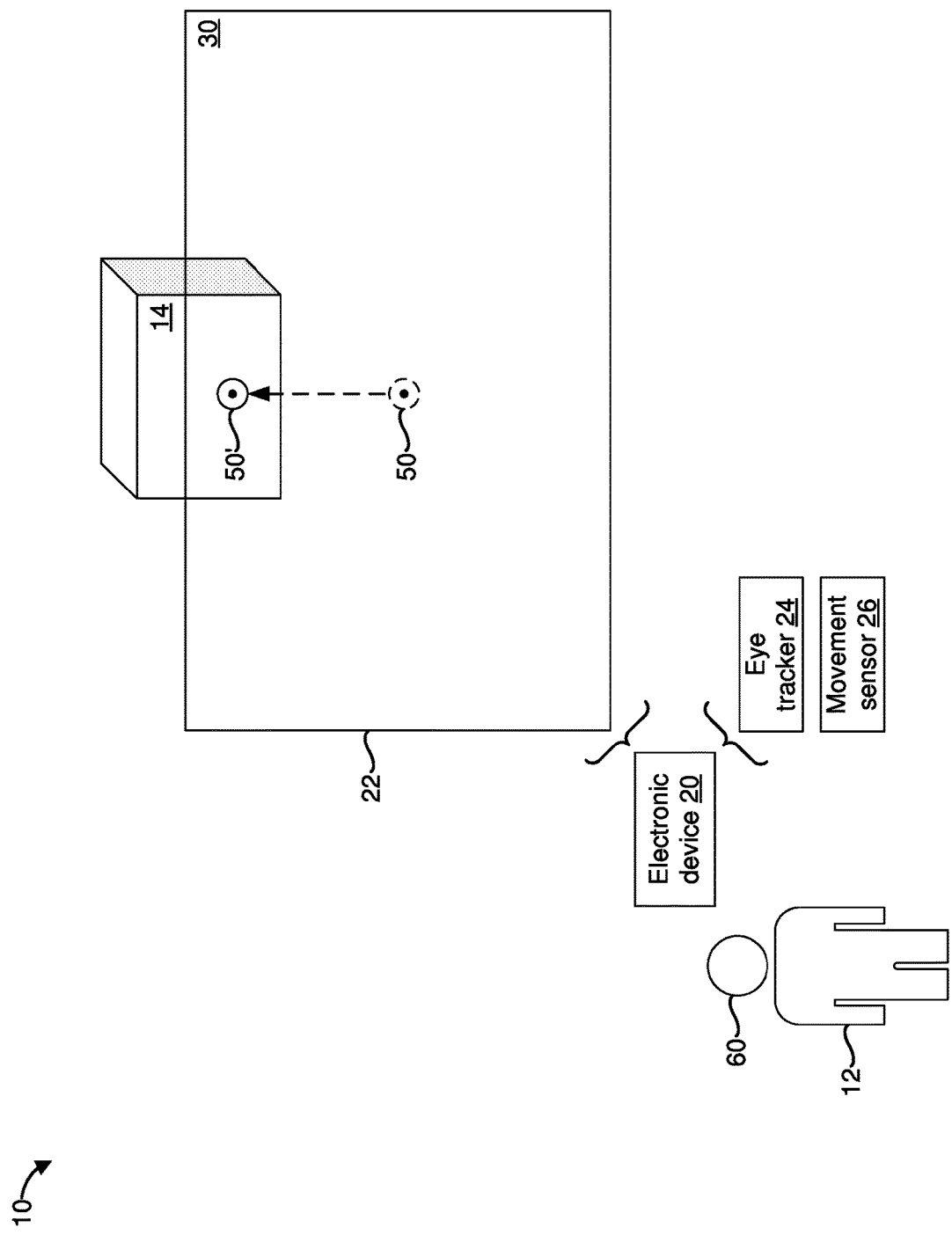

Referring to FIG. 1D, in various implementations, the electronic device 20 modifies the display characteristic of the virtual content 40 by ceasing to display the virtual content 40 (shown in FIGS. 1A and 1B). For example, as can be seen in FIG. 1D, the XR environment 30 does not include the virtual content 40 thereby providing the user 12 an unobstructed view of the XR object 14.

In various implementations, modifying the display characteristic of the virtual content 40 based on corresponding opposing movements of the gaze and the head reduces a need for performing operations associated with computer vision using a forward-facing camera of the electronic device 20. For example, the electronic device 20 may determine that the user 12 is looking at a particular physical article in the physical environment 10 without having to perform object detection (e.g., edge detection) on an image of the physical environment 10 thereby conserving computing resources. The corresponding opposing movements of the gaze and the head indicate that the user 12 is likely interested in gazing at the XR object 14, and the electronic device 20 adjusts a display characteristic of the virtual content 40 in order to allow the user 12 to continue gazing at the XR object 14 without significant interference from the virtual content 40.

In some implementations, the XR object 14 represents another electronic device in the physical environment 10 and the electronic device 20 initiates communication with the other electronic device in response to the gaze of the user 12 being directed to the other electronic device. For example, the XR object 14 may represent a laptop and the electronic device 20 triggers the laptop to switch from a sleep mode to an ON mode. In some implementations, the XR object 14 represents an electrical appliance such as an oven or a stove, and the electronic device 20 transmits control signal data that triggers the electrical appliance to perform an operation (e.g., the electronic device 20 triggers the oven to turn ON and start preheating to a specified temperature).

In some implementations, the electronic device 20 modifies the display characteristic of the virtual content 40 in response to the XR object 14 satisfying a user interest value. The XR object 14 satisfying the user interest value is an indication that the user 12 is likely interested in gazing at the XR object 14. In some implementations, the XR object 14 satisfies the user interest value when the XR object 14 is moving and/or generating a sound. For example, the XR object 14 may represent a physical dog in the physical environment 10 that starts barking and the user 12 may want to look at the dog. As another example, the XR object 14 may represent a physical smartphone in the physical environment 10 that starts ringing and the user 12 may want to look at the smartphone to see who is calling.

In some implementations, the electronic device 20 modifies the display characteristic of the virtual content 40 in response to the virtual content 40 being of a particular type, and the electronic device 20 forgoes modifying the display characteristic of the virtual content 40 in response to the virtual content 40 not being of the particular type. For example, the electronic device 20 may modify the display characteristic of the virtual content 40 in response to the virtual content 40 being display-locked content that is locked to a particular position on the display 22, and the electronic device 20 may forgo modifying the display characteristic of the virtual content 40 in response to the virtual content 40 being body-locked content or world-locked content.

As described herein, in some implementations, the XR environment 30 is an optical or a video pass-through of the physical environment 10, the XR object 14 represents a physical article in the physical environment 10, and the electronic device 20 modifies a display characteristic of the virtual content 40 in order to reduce a visual interference of the virtual content 40 with an ability of the user 12 to view the physical article that the XR object 14 represents. As described herein, in some implementations, the XR object 14 is a body-locked or world-locked virtual object, and the electronic device 20 modifies the display characteristic of the virtual content 40 in order to allow the user 12 to view the body-locked or world-locked virtual object with reduced visual interference from the virtual content 40. As described herein, in some implementations, the XR environment 30 is a virtual environment that may not resemble the physical environment 10, the XR object 14 is a virtual object, and the electronic device 20 modifies the display characteristic of the virtual content 40 in order to allow the user 12 to view the virtual object with less interference from the virtual content 40.

Figure 2:
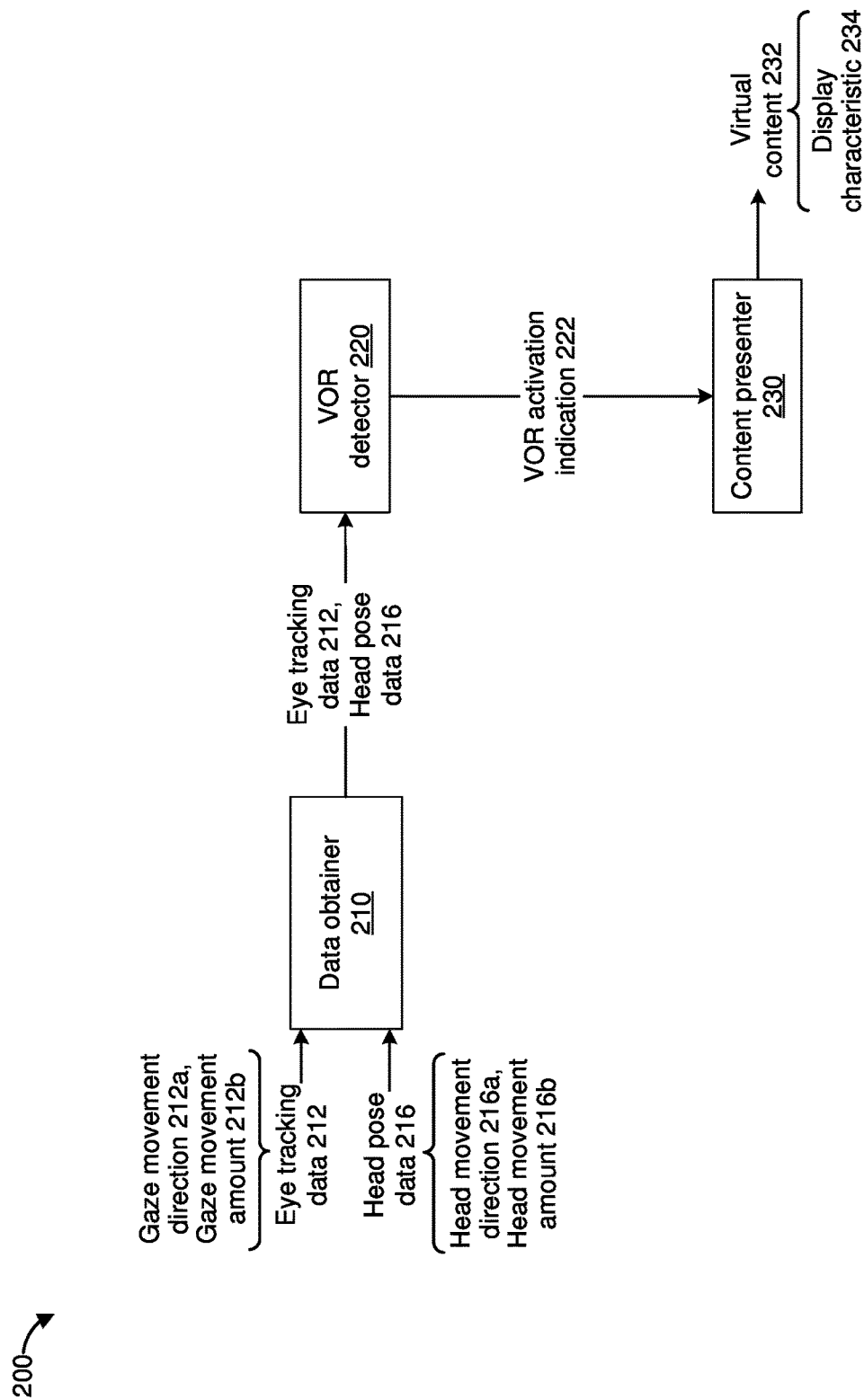
FIG. 2 is a diagram of a content presentation system in accordance with some implementations.

FIG. 2 is a block diagram of a content presentation system 200 in accordance with some implementations. In some implementations, the content presentation system 200 resides at (e.g., is implemented by) the electronic device 20 shown in FIGS. 1A-1D. In various implementations, the content presentation system 200 includes a data obtainer 210, a vestibulo ocular reflex (VOR) detector 220 and a content presenter 230.

In various implementations, the data obtainer 210 obtains eye tracking data 212 from the eye tracker 24 (shown in FIGS. 1A-1D) and head pose data 216 from the movement sensor 26 (shown in FIGS. 1A-1D). In some implementations, the eye tracking data 212 indicates a gaze movement direction 212a and a gaze movement amount 212b. For example, the eye tracking data 212 indicates the first direction 52 shown in FIG. 1B. In some implementations, the head pose data 216 indicates a head movement direction 216a and a head movement amount 216b. For example, the head pose data 216 indicates the second direction 62 shown in FIG. 1B.

In various implementations, the VOR detector 220 determines whether the user 12 has activated his/her VOR. In some implementations, the VOR detector 220 detects activation of the VOR by determining whether a movement of the gaze and a movement of the head are corresponding opposing movements. The VOR detector 220 can determine that the movement of the gaze and the movement of the head are corresponding opposing movements when the gaze movement direction 212a and the head movement direction 216a are opposite from each other and the gaze movement amount 212b and the head movement amount 216b are within a threshold from each other. In some implementations, detecting activation of the VOR indicates that a gaze of a user is fixated on a portion of a physical environment (e.g., on the XR object 14 shown in FIGS. 1A-1D) and virtual content intersecting with a line of sight from the user to the portion of the physical environment may be interfering with the user's ability to properly view the portion of the physical environment. In some implementations, detecting activation of the VOR indicates that a gaze of a user is fixated on a body-locked or world-locked virtual object and virtual content intersecting with a line of sight from the user to the body-locked or world-locked virtual object may be interfering with the user's ability to properly view the body-locked or world-locked virtual object.

In various implementations, the VOR detector 220 provides a VOR activation indication 222 to the content presenter 230. In some implementations, the VOR activation indication 222 indicates that a gaze of a user is fixated on a portion of a physical environment (e.g., instead of being fixated on virtual content that may be obstructing a view of the physical environment). In some implementations, the VOR activation indication 222 indicates that virtual content is obstructing a view of a physical article that the user is trying to focus on (e.g., gazing at). In some implementations, the VOR activation indication 222 indicates that a gaze of a user is fixated on a body-locked or world-locked virtual object (e.g., instead of being fixated on virtual content that may be obstructing a view of the body-locked or world-locked virtual object). In some implementations, the VOR activation indication 222 indicates that virtual content is obstructing a view of the body-locked or world-locked virtual object that the user is trying to focus on (e.g., gazing at).

In various implementations, the content presenter 230 presents virtual content 232 (e.g., the virtual content 40 shown in FIGS. 1A and 1B). In some implementations, the virtual content 232 is associated with a display characteristic 234. In some implementations, the display characteristic 234 includes a transparency value that defines a transparency level of the virtual content 232. In some implementations, the display characteristic 234 includes an opaqueness value that defines an opaqueness level of the virtual content 232. In some implementations, the display characteristic 234 includes a size value (e.g., a font size value) that defines a size of the virtual content 232. In some implementations, the display characteristic 234 includes a set of color values that defines a color of the virtual content 232. In some implementations, the display characteristic 234 includes a font style that defines a font style of a textual portion of the virtual content 232 (e.g., Arial, Times New Roman, Bold, Italic, etc.).

In various implementations, the content presenter 230 modifies the display characteristic 234 of the virtual content 232 based on the VOR activation indication 222. In some implementations, the content presenter 230 modifies the display characteristic 234 of the virtual content 232 in response to the VOR activation indication 222 indicating an activation of the VOR, and the content presenter 230 forgoes modifying the display characteristic 234 of the virtual content 232 in response to the VOR activation indication 222 not indicating an activation of the VOR.

In some implementations, the content presenter 230 modifies the display characteristic 234 by changing a value of the display characteristic 234 so that the virtual content 232 causes less visual interference with the user's ability to view a portion of an XR environment (e.g., a portion of a physical environment or a virtual environment). In some implementations, the content presenter 230 can increase a transparency value of the virtual content 232 so that the user can view the portion of the XR environment (e.g., the XR object 14 shown in FIGS. 1A-1D) through the virtual content 232. In some implementations, the content presenter 230 decreases an opaqueness value of the virtual content 232 so that the user can see the portion of the XR environment that the virtual content 232 was previously occluding. In some implementations, the content presenter 230 decreases a size value (e.g., a font size value for textual content and/or a resolution value for graphical content) of the virtual content 232, for example, because a smaller version of the virtual content 232 is less likely to obstruct a view of a portion of the XR environment.

In some implementations, the content presenter 230 modifies the display characteristic 234 of the virtual content 232 by changing a placement of the virtual content 232. A current position of the virtual content 232 may intersect a line of sight from an eye of the user to a portion of the XR environment that the user is gazing at. The content presenter 230 can move the virtual content 232 from the current position to a new position that does not intersect the line of sight from the eye of the user to the portion of the XR environment that the user is gazing at. As such, while an initial display location of the virtual content may obstruct a view of a physical article or a body-locked/world-locked virtual object, a modified display location of the virtual content may provide an unobstructed view of the physical article or the body-locked/world-locked virtual object. As an example, referring to FIG. 1B, the electronic device 20 may move the virtual content 40 towards a bottom of the display 22 so that the virtual content 40 does not intersect a line of sight from an eye of the user 12 to the XR object 14.

In some implementations, the content presenter 230 can change a color of the virtual content 232 to reduce the visual interference that the virtual content 232 causes (e.g., switch from vibrant colors such as red and blue to a dull color such as gray). As an example, the content presenter 230 may switch from displaying a colorful version of the virtual content 232 to displaying a grayscale version of the virtual content 232 in addition to increasing a transparency of the virtual content 232. In some implementations, the content presenter 230 can change a font style of the virtual content 232 to reduce the visual interference that the virtual content 232 causes. For example, the content presenter 230 may switch to a narrower font style (e.g., switch from Arial to Arial Narrow). As another example, the content presenter 230 may switch from Bold text to regular text. The content presenter 230 can select a less obstructive font style in addition to increasing a transparency of the virtual content 232.

In various implementations, the content presenter 230 concurrently modifies multiple display characteristic values (e.g., a first display characteristic value, a second display characteristic value, . . . , and an nth display characteristic value) of the virtual content 232. For example, the content presenter 230 may simultaneously increase a transparency level of the virtual content 232, decrease an overall size of the virtual content 232, switch from displaying a colorful version of the virtual content 232 to a black-and-white version of the virtual content 232 and select a narrower font for a textual portion of the virtual content 232 in order to reduce an obstructiveness of the virtual content 232.

In some implementations, the content presenter 230 modifies the display characteristic 234 of the virtual content 232 by blurring the virtual content 232. Blurring the virtual content 232 may reduce the visual interference that the virtual content 232 causes. For example, if the virtual content 232 is blurred, the user may be less inclined to view the virtual content 232 and may instead focus on a portion of the XR environment.

Figure 3:
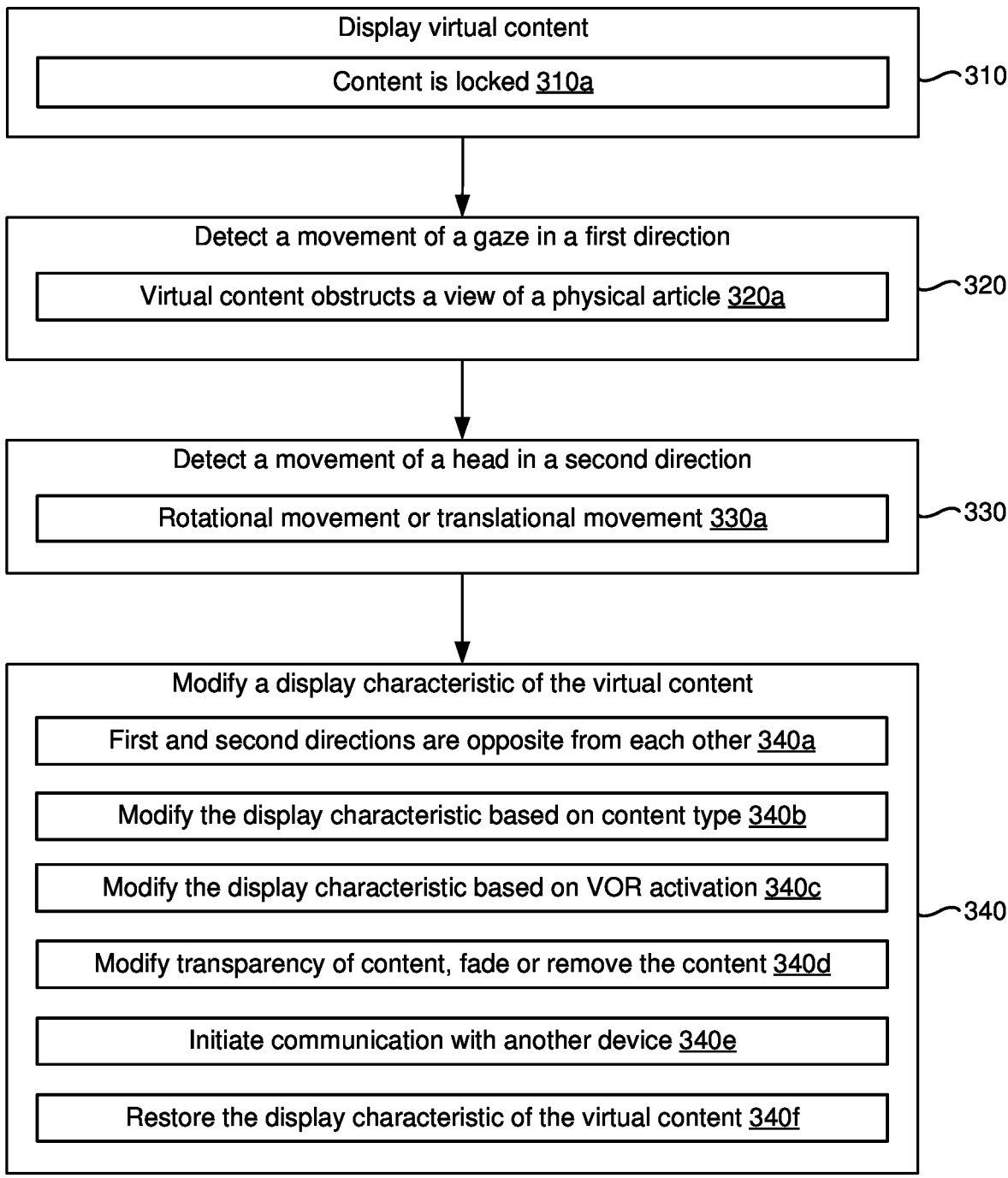
FIG. 3 is a flowchart representation of a method of modifying a display characteristic of virtual content in accordance with some implementations.

FIG. 3 is a flowchart representation of a method 300 for modifying a display characteristic of virtual content. In various implementations, the method 300 is performed by the electronic device 20 shown in FIGS. 1A-1D and/or the content presentation system 200 shown in FIG. 2. In some implementations, the method 300 is performed by processing logic, including hardware, firmware, software, or a combination thereof. In some implementations, the method 300 is performed by a processor executing code stored in a non-transitory computer-readable medium (e.g., a memory).

As represented by block 310, in various implementations, the method 300 includes displaying, via the display, virtual content. For example, as shown in FIG. 1A, the electronic device 20 displays the virtual content 40. In some implementations, displaying the virtual content includes displaying the virtual content within an XR environment (e.g., within the XR environment 30 shown in FIGS. 1A-1D). In some implementations, displaying the virtual content includes overlaying the virtual content onto an optical or video pass-through of a physical environment. For example, as described in relation to FIG. 1A, in some implementations, the XR environment 30 is a pass-through of the physical environment 10. In other implementations, displaying the virtual content includes overlaying the virtual content onto a view of a virtual environment. For example, as described in relation to FIG. 1A, in some implementations, the XR environment 30 is a virtual environment that does not correspond to (e.g., does not resemble) the physical environment 10 of the electronic device 20.

As represented by block 310a, in some implementations, the virtual content is locked to a particular position of the display. For example, as described in relation to FIG. 1A, in some implementations, the virtual content 40 includes display-locked content that is locked to a top portion of the display 22. In some implementations, the virtual content corresponds to a heads-up display (HUD) that is display-locked towards a top of the display. For example, as shown in FIG. 1A, the virtual content 40 is displayed towards a top edge of the display 22 and the virtual content 40 may be display-locked to the top edge of the display 22.

As represented by block 320, in various implementations, the method 300 includes detecting, via the eye tracker, a movement of a gaze in a first direction. For example, as shown in FIG. 1B, the eye tracker 24 detects that a gaze of the user 12 is moving in the first direction 52. In some implementations, the eye tracker includes an image sensor (e.g., a camera) that captures an image of at least one eye of the user, and the method 300 includes utilizing the image to determine the movement of the gaze in the first direction. In some implementations, the method 300 includes detecting that the gaze of the user is moving in a direction towards the virtual content. For example, as shown in FIG. 1B, the electronic device 20 detects that the gaze of the user 12 is moving towards the virtual content 40.

As represented by block 320a, in some implementations, the method 300 includes determining that the movement of the gaze results in the virtual content intersecting a line of sight between an eye of a user and an object (e.g., a representation of a physical article in a physical environment of the electronic device, or a body-locked or world-locked virtual object). For example, referring to FIGS. 1B and 1C, the movement of the gaze in the first direction 52 results in a line of sight passing through the new gaze position 50' that intersects with the virtual content 40. In some implementations, the method 300 includes determining that as a result of the movement of the gaze in the first direction the virtual content is obstructing a view of an XR object (e.g., a representation of a physical article in the physical environment of the electronic device, or a body-locked or world-locked virtual object). In some implementations, the method 300 includes modifying a display characteristic of the virtual content in response to determining that the virtual content intersects the line of sight between the eye of the user and the XR object (e.g., modifying the display characteristic of the virtual content in response to determining that the virtual content obstructs a view of the XR object).

In some implementations, the method 300 includes determining that the XR object (e.g., the physical article, or the body-locked or world-locked virtual object) is moving. In some implementations, the movement of the XR object may attract the user's attention. As such, the user may be more interested in viewing the moving XR object than the virtual content displayed on the device. In some implementations, the device determines whether the gaze is directed to the moving XR object and whether the virtual content is obstructing a view of the moving XR object. In some implementations, the device modifies a display characteristic of the virtual content in response to determining that the gaze is directed to the moving XR object and the virtual content is obstructing a view of the moving XR object.

In some implementations, the method 300 includes determining that a user interest value associated with the XR object (e.g., a representation of a physical article, or a body-locked or world-locked virtual object) exceeds a threshold interest value. In some implementations, the device determines that the user is interested in viewing the XR object when the user interest value associated with the XR object exceeds the threshold interest value, and the device determines that the user is not interested in viewing the XR object when the user interest value associated with the XR object does not exceed the threshold interest value. In some implementations, the device modifies a display characteristic of the virtual content in response to determining that the virtual content obstructs a view of an XR object that is associated with a user interest value that exceeds the threshold interest value. In some implementations, the device forgoes modifying the display characteristic of the virtual content in response to determining that the user interest value of the XR object does not exceed the threshold interest value even if the virtual content obstructs a view of the XR object.

In some implementations, the method 300 includes determining the line of sight based on the gaze and an image of the physical environment captured by an image sensor. In some implementations, the device includes a first image sensor that is a part of the eye tracker and faces the user (e.g., a user-facing image sensor), and the device includes a second image sensor that faces the physical environment (e.g., a scene-facing image sensor). The device can use gaze data from the user-facing image sensor and an image from the scene-facing image sensor to determine a line of sight between an eye of the user and a portion of the physical environment.

In some implementations, the method 300 includes identifying, based on the movement of the gaze and the movement of the head, a visual fixation point in an XR environment (e.g., a physical environment of the device or a virtual environment), detecting that the virtual content obstructs a view of the visual fixation point, and modifying a display characteristic of the virtual content in response to detecting that the virtual content obstructs a view of the visual fixation point. In some implementations, the device modifies a display characteristic of the virtual content in response to the virtual content obstructing a view of the visual fixation point, and the device forgoes modifying the display characteristic of the virtual content in response to the virtual content not obstructing a view of the visual fixation point. The visual fixation point may correspond to a location of a physical article in the physical environment, or a location of a body-locked or world-locked virtual object (e.g., the XR object 14 shown in FIGS. 1A-1D).

As represented by block 330, in various implementations, the method 300 includes detecting, via the movement sensor, a movement of a head in a second direction while detecting the movement of the gaze in the first direction. For example, as shown in FIG. 1B, the movement sensor 26 detects the movement of the head 60 of the user 12 in the second direction 62 while the eye tracker 24 is detecting the movement of the gaze in the first direction 52. In some implementations, the device concurrently detects the movement of the gaze in the first direction and the movement of the head in the second direction.

As represented by block 330a, in some implementations, detecting the movement of the gaze includes detecting a rotational movement of the gaze about an axis in the first direction, and detecting the movement of the head includes detecting a rotational movement of the head about the axis in the second direction. For example, referring to FIG. 1B, the electronic device 20 detects the movement of the gaze about a horizontal axis in the first direction 52 while detecting the movement of the head 60 about the horizontal axis in the second direction 62. In the example of FIG. 1B, the axis is a horizontal axis. In some implementations, the device concurrently detects a movement of the gaze about a vertical axis in a first direction and a movement of the head about the vertical axis in the second direction. For example, the device concurrently detects a movement of the gaze leftwards and a movement of the head rightwards.

In some implementations, detecting the movement of the head includes detecting a translational movement of the head in the second direction by a particular distance, and detecting the movement of the gaze includes detecting a rotational movement of the gaze in the first direction by an amount that is a function of the particular distance of the translational movement of the head. For example, the user may be walking in a forward direction while turning his/her head leftwards in order to keep his/her gaze fixated at a particular portion of the XR environment (e.g., at a particular portion of a physical environment or a virtual environment).

As represented by block 340, in various implementations, the method 300 includes, in accordance with a determination that the movement of the gaze in the first direction and the movement of the head in the second direction are corresponding opposing movements, modifying a display characteristic of the virtual content. For example, as shown in FIGS. 1B and 1C, the electronic device 20 modifies a display characteristic of the virtual content 40 in order to generate and present the modified virtual content 40' that causes less visual interference as the user 12 is trying to view the XR object 14.

In various implementations, modifying the display characteristic of the virtual content allows the user of the device to view an XR object (e.g., a pass-through representation of a physical article or a body-locked or world-locked virtual object) that would otherwise be occluded by the virtual content. In some implementations, modifying the display characteristic of the virtual content provides the user a less obstructed view (e.g., an unobstructed view) of the XR object (e.g., the physical article, or the body-locked or world-locked virtual object). In some implementations, modifying the display characteristic of the virtual content allows the user to view a portion of the physical environment that was obscured by the virtual content without requiring the user to move the device. For example, if the device is an HMD, modifying the display characteristic of the virtual content allows the user to view a portion of the physical environment that was occluded by the virtual content without requiring the user to dismount (e.g., take off) the HMD from his/her head. In this example, the user can keep wearing the HMD and still view the portion of the physical environment that was initially occluded by the virtual content.

As represented by block 340a, in some implementations, the movement of the gaze in the first direction and the movement of the head in the second direction are determined to be corresponding opposing movements in response to the first direction and the second direction being opposite from each other and an amount of the movement of the head being within a threshold of an amount of the movement of the gaze. For example, referring to FIG. 1B, the movement of the gaze in the first direction 52 and the movement of the head 60 in the second direction 62 are determined to be corresponding opposing movements because the first direction 52 and the second direction 62 are opposite to each other and because an amount of movement of the gaze is within a threshold of an amount of movement of the head 60. In some implementations, the method 300 includes, in accordance with the movement of the head and the movement of the gaze not being corresponding opposing movements, forgo modifying the display characteristic of the virtual content. For example, if the gaze and the head are not moving in opposite directions or an amount of gaze movement is not within a similarity threshold of an amount of head movement, the device does not modify the display characteristic of the virtual content.

In some implementations, the first direction is toward the virtual content and the second direction is away from the virtual content. For example, as shown in FIG. 1B, the virtual content 40 is displayed near a top of the display 22, the gaze is moving towards the virtual content 40 in the first direction 52 and the head is moving away from the virtual content 40 in the second direction 62.

As represented by block 340b, in some implementations, modifying the display characteristic is further in accordance with a determination that the virtual content is of a first type. For example, in some implementations, the device modifies the display characteristic of the virtual content in response to determining that the virtual content includes head-locked content. As an example, the device modifies the display characteristic of the virtual content in response to the virtual content being display-locked content, for example, in response to the virtual content being locked to a particular position of the display. In some implementations, the method 300 includes, in accordance with a determination that the virtual content is of a second type, forgo modifying the display characteristic of the virtual content. For example, in some implementations, the device forgoes modifying the display characteristic of the virtual content in response to determining that the virtual content is world-locked content or body-locked content. As an example, the device may not modify the display characteristic of the virtual content in response to the virtual content not being display-locked, for example, when the virtual content is not locked to a particular position of the display.

As represented by block 340c, in some implementations, the method 300 includes detecting an activation of a vestibulo ocular reflex (VOR) based on the movement of the gaze and the movement of the head. For example, as shown in FIG. 2, the VOR detector 220 detects VOR activation based on the eye tracking data 212 and the head pose data 216. In some implementations, the device determines that the opposing concurrent movements of the gaze and the head is an indication of VOR activation. For example, as discussed in relation to FIG. 2, the VOR detector 220 detects VOR activation when the gaze movement direction 212a is opposite from the head movement direction 216a and the gaze movement amount 212b is within a correspondence threshold (e.g., a similarity threshold, for example, about the same as) of the head movement amount 216b.

As represented by block 340d, in some implementations, modifying the display characteristic of the virtual content includes ceasing display of the virtual content. For example, as shown in FIG. 1D, the electronic device 20 ceases display of the virtual content 40. Ceasing display of the virtual content provides an unobstructed view of a portion of an XR environment (e.g., the physical environment or the virtual environment) that the gaze is directed to. For example, in FIG. 1D, ceasing the display of the virtual content 40 provides an unobstructed view of the XR object 14 without requiring the user 12 to stop using the electronic device 20 (e.g., without requiring the user 12 to dismount the HMD if the electronic device 20 is an HMD, or without requiring the user 12 to move the smartphone or tablet out of the way if the electronic device 20 is a smartphone or a tablet).

In some implementations, modifying the display characteristic of the virtual content includes increasing a transparency of the virtual content. For example, as discussed in relation to FIGS. 1B and 1C, in some implementations, the electronic device 20 increases a transparency of the virtual content 40 in order to generate the modified virtual content 40' that is more transparent than the virtual content 40. Increasing a transparency of the virtual content makes the virtual content less obstructive thereby allowing the user to view a portion of an XR environment (e.g., the physical environment or a virtual environment) that may have been completely obstructed by the virtual content prior to increasing the transparency of the virtual content.

In some implementations, modifying the display characteristic of the virtual content includes fading the virtual content. For example, the device may display a fading away of the virtual content. While the virtual content is being faded away, if the user reverts the movement of his/her gaze and his/her head, the device can stop fading away the virtual content and display the virtual content with an initial level of opaqueness.

In some implementations, modifying the display characteristic of the virtual content includes blurring the virtual content. For example, the device may blur the virtual content so that the virtual content is unreadable. Blurring the virtual content may help the user in focusing on a portion of an XR environment (e.g., the physical environment or a virtual environment) because the user may be less inclined to view the blurred virtual content.

As represented by block 340e, in some implementations, the method 300 includes determining that the gaze is directed to an XR object representing a second electronic device in a physical environment of the electronic device, and initiating electronic communication with the second electronic device that the gaze is directed to. For example, as described in relation to FIG. 1D, the XR object 14 may represent another electronic device such as a laptop and the electronic device 20 may initiate electronic communication with the other electronic device. For example, the electronic device may establish a wireless communication link (e.g., an air link) with the laptop. In some implementations, the electronic device may transmit control signal data to the second electronic device. The control signal data may trigger the second electronic device to perform an operation. If the second electronic device is an electrical appliance such as an oven or a stove, the control signal data may trigger the electrical appliance to turn on (e.g., the oven may start pre-heating or a heating element of the stove may turn on).

As represented by block 340f, in some implementations, the method 300 includes, after displaying the virtual content with a modified display characteristic, restoring the display characteristic of the virtual content. For example, referring to FIGS. 1B and 1C, the electronic device 20 may revert to displaying the virtual content 40 (shown in FIG. 1B) after displaying the modified virtual content 40' (shown in FIG. 1C).

In some implementations, restoring the display characteristic of the virtual content includes restoring the display characteristic of the virtual content after displaying the virtual content with the modified display characteristic for a threshold amount of time. For example, referring to FIGS. 1B and 1C, the electronic device 20 may revert to displaying the virtual content 40 (shown in FIG. 1B) after displaying the modified virtual content 40' (shown in FIG. 1C) for a threshold amount of time.

In some implementations, restoring the display characteristic of the virtual content includes restoring the display characteristic of the virtual content in response to a subsequent movement of the gaze in a particular direction and a subsequent movement of the head in the particular direction. For example, referring to FIGS. 1B and 1C, the electronic device 20 may revert to displaying the virtual content 40 (shown in FIG. 1B) after displaying the modified virtual content 40' (shown in FIG. 1C) in response to detecting concurrent movement of the gaze and the head 60 in the same direction (e.g., in response to detecting that the gaze and the head 60 concurrently move upwards).

In some implementations, restoring the display characteristic of the virtual content includes restoring the display characteristic of the virtual content in response to concurrently detecting a subsequent movement of the gaze in the second direction and a subsequent movement of the head in the first direction. For example, referring to FIGS. 1B and 1C, the electronic device 20 may revert to displaying the virtual content 40 (shown in FIG. 1B) after displaying the modified virtual content 40' (shown in FIG. 1C) in response to detecting concurrent movement of the gaze in the second direction 62 and the head 60 in the first direction 52 (e.g., in response to detecting concurrent movement of the gaze downwards and the head 60 upwards)

In some implementations, restoring the display characteristic of the virtual content includes restoring the display characteristic of the virtual content in response to detecting a deactivation of a vestibulo ocular reflex (VOR). For example, referring to FIG. 2, after the content presenter 230 modifies the display characteristic 234 of the virtual content 232 based on the VOR activation indication 222, the VOR detector 220 may detect a deactivation of the VOR and the VOR detector 220 triggers the content presenter 230 to restore the display characteristic 234 from a modified display characteristic value to an initial display characteristic value.

Figure 4:
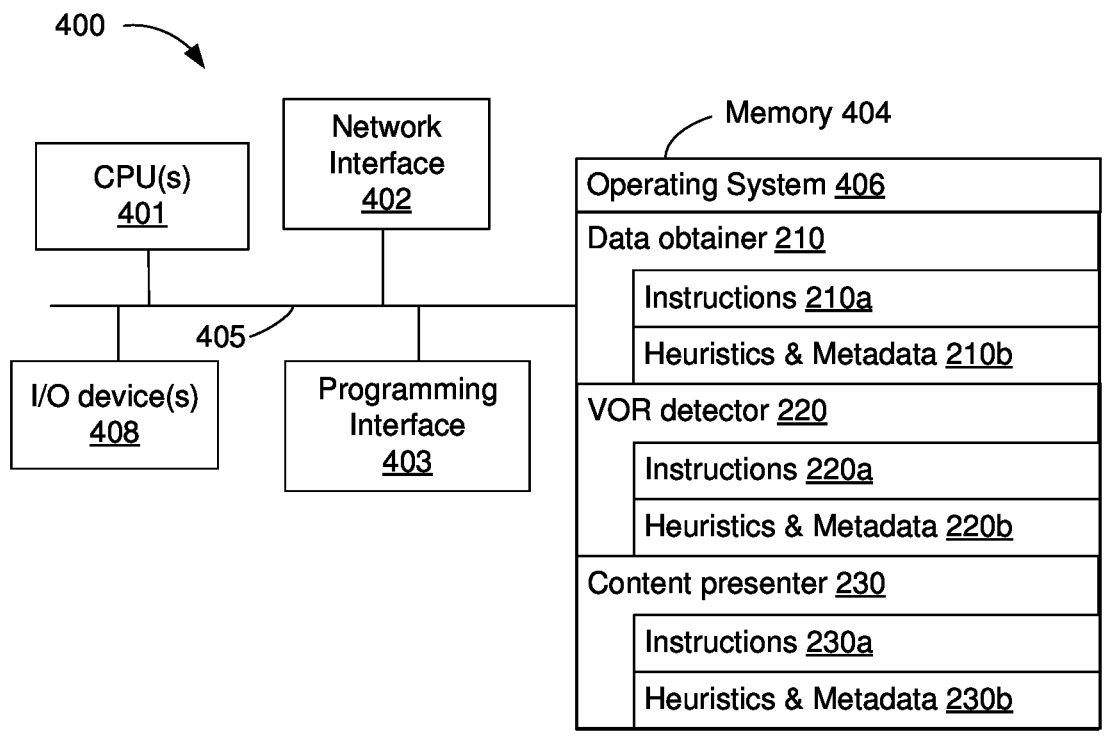
FIG. 4 is a block diagram of a device that modifies a display characteristic of virtual content in accordance with some implementations.

FIG. 4 is a block diagram of a device 400 in accordance with some implementations. In some implementations, the device 400 implements the electronic device 20 shown in FIGS. 1A-1D and/or the content presentation system 200 shown in FIG. 2. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the device 400 includes one or more processing units (CPUs) 401, a network interface 402, a programming interface 403, a memory 404, one or more input/output (I/O) devices 408, and one or more communication buses 405 for interconnecting these and various other components.

In some implementations, the network interface 402 is provided to, among other uses, establish and maintain a metadata tunnel between a cloud hosted network management system and at least one private network including one or more compliant devices. In some implementations, the one or more communication buses 405 include circuitry that interconnects and controls communications between system components. The memory 404 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 404 optionally includes one or more storage devices remotely located from the one or more CPUs 401. The memory 404 comprises a non-transitory computer readable storage medium.

In some implementations, the one or more I/O devices 408 include a display for displaying virtual content (e.g., the display 22 shown in FIGS. 1A-1D). In some implementations, the display includes an XR display. In some implementations, the display includes an opaque display. Alternatively, in some implementations, the display includes an optical see-through display. In some implementations, the one or more I/O devices 408 include an eye tracker (e.g., the eye tracker 24 shown in FIGS. 1A-1D) that obtains eye tracking data (e.g., the eye tracking data 212 shown in FIG. 2). In some implementations, the eye tracker includes an image sensor (e.g., a camera, for example, a visible light camera or an infrared light (IR) camera) that captures an image of an eye of a user of the device 400. In some implementations, the one or more I/O devices include a movement sensor (e.g., the movement sensor 26 shown in FIGS. 1A-1D) that detects a movement of a body part of the user. In some implementations, the movement sensor includes an inertial measurement unit (IMU) that detects a head pose.

In some implementations, the memory 404 or the non-transitory computer readable storage medium of the memory 404 stores the following programs, modules and data structures, or a subset thereof including an optional operating system 406, the data obtainer 210, the VOR detector 220 and the content presenter 230. In various implementations, the data obtainer 210 includes instructions 210a, and heuristics and metadata 210b for obtaining eye tracking data and head pose data (e.g., the eye tracking data 212 and the head pose data 216 shown in FIG. 2). In various implementations, the VOR detector 220 includes instructions 220a, and heuristics and metadata 220b for detecting VOR activation based on the eye tracking data and the head pose data (e.g., for generating the VOR activation indication 222 shown in FIG. 2). In various implementations, the content presenter 230 includes instructions 230a, and heuristics and metadata 230b for modifying a display characteristic of the virtual content (e.g., for modifying the display characteristic 234 of the virtual content 232 shown in FIG. 2). In various implementations, the device 400 performs the method 300 shown in FIG. 3.

It will be appreciated that FIG. 4 is intended as a functional description of the various features which may be present in a particular implementation as opposed to a structural schematic of the implementations described herein. As recognized by those of ordinary skill in the art, items shown separately could be combined and some items could be separated. For example, some functional blocks shown separately in FIG. 4 could be implemented as a single block, and the various functions of single functional blocks could be implemented by one or more functional blocks in various implementations. The actual number of blocks and the division of particular functions and how features are allocated among them will vary from one implementation to another and, in some implementations, depends in part on the particular combination of hardware, software, and/or firmware chosen for a particular implementation.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

What is claimed is:

1. A method comprising:
   at an electronic device including a non-transitory memory, one or more processors, a display, an eye tracker and a movement sensor:
   displaying, via the display, a display-locked virtual object that maintains position on the display in response to a positional change of the electronic device;
   detecting, via the eye tracker, a movement of a gaze in a first direction;
   detecting, via the movement sensor, a movement of a head in a second direction while detecting the movement of the gaze in the first direction;
   identifying, based on the movement of the gaze and the movement of the head, a visual fixation point in a physical environment of the electronic device;
   detecting that the display-locked virtual object obstructs a view of the visual fixation point; and
   in response to detecting that the display-locked virtual object obstructs the view of the visual fixation point, decreasing a visibility of the display-locked virtual object.

2. The method of claim 1, wherein decreasing the visibility of the display-locked virtual object is further in accordance with a determination that the display-locked virtual object is of a first type.

3. The method of claim 1, wherein the visual fixation point corresponds to a physical article in the physical environment.

4. The method of claim 3, wherein decreasing the visibility of the display-locked virtual object comprises decreasing the visibility of the display-locked virtual object in response to determining that a user interest value associated with the physical article exceeds a threshold interest value.

5. The method of claim 1, wherein identifying the visual fixation point includes detecting an activation of a vestibulo ocular reflex (VOR) based on the movement of the gaze and the movement of the head.

6. The method of claim 1, wherein detecting the movement of the gaze comprises detecting a rotational movement of the gaze about an axis in the first direction; and
   wherein detecting the movement of the head comprises detecting a rotational movement of the head about the axis in the second direction.

7. The method of claim 1, wherein detecting the movement of the head comprises detecting a translational movement of the head in the second direction by a particular distance; and
   wherein detecting the movement of the gaze comprises detecting a rotational movement of the gaze in the first direction by an amount that is a function of the particular distance of the translational movement of the head.

8. The method of claim 1, wherein decreasing the visibility of the display-locked virtual object comprises ceasing display of the display-locked virtual object.

9. The method of claim 1, wherein decreasing the visibility of the display-locked virtual object comprises increasing a transparency of the display-locked virtual object.

10. The method of claim 1, wherein decreasing the visibility of the display-locked virtual object comprises fading the display-locked virtual object.

11. The method of claim 3, wherein the physical article is a second electronic device, further comprising, in response to identifying the visual fixation point, initiating electronic communication with the second electronic device.

12. The method of claim 1, further comprising, after decreasing the visibility of the display-locked virtual object, increasing the visibility of the display-locked virtual object.

13. A device comprising:
    a display;
    an eye tracker;
    a movement sensor;
    one or more processors;
    a non-transitory memory; and
    one or more programs stored in the non-transitory memory, which, when executed by the one or more processors, cause the device to:
    display, via the display, a display-locked virtual object that maintains position on the display in response to a positional change of the electronic device;
    detect, via the eye tracker, a movement of a gaze in a first direction;
    detect, via the movement sensor, a movement of a head in a second direction while detecting the movement of the gaze in the first direction;
    identify, based on the movement of the gaze and the movement of the head, a visual fixation point in a physical environment of the device;
    detect that the display-locked virtual object obstructs a view of the visual fixation point; and
    in response to detecting that the display-locked virtual object obstructs the view of the visual fixation point, decrease a visibility of the display-locked virtual object.

14. A non-transitory memory storing one or more programs, which, when executed by one or more processors of a device with an eye tracker, a movement sensor and a display, cause the device to:
    display, via the display, a display-locked virtual object that maintains position on the display in response to a positional change of the electronic device;
    detect, via the eye tracker, a movement of a gaze in a first direction;

detect, via the movement sensor, a movement of a head in a second direction while detecting the movement of the gaze in the first direction;

identify, based on the movement of the gaze and the movement of the head, a visual fixation point in a physical environment of the electronic device;

detect that the display-locked virtual object obstructs a view of the visual fixation point; and in response to detecting that the display-locked virtual object obstructs the view of the visual fixation point, decrease a visibility of the display-locked virtual object.

15. The method of claim 1, wherein identifying the visual fixation point includes determining that the movement of the gaze and the movement of the head are corresponding opposing movements.

16. The method of claim 15, wherein the movement of the gaze and the movement of the head are determined to be corresponding opposing movements in response to the first direction and the second direction being opposite from each other and an amount of the movement of the head being within a threshold of an amount of the movement of the gaze.

17. The method of claim 1, wherein the movement of the head moves the display-locked virtual object in front of the visual fixation point.

18. The method of claim 1, wherein detecting that the display-locked virtual object obstructs the view of the visual fixation point includes determining that the display-locked virtual object obstructs, after the movement of the head, the view of the visual fixation point.

19. The method of claim 3, wherein decreasing the visibility of the display-locked virtual object comprises decreasing the visibility of the display-locked virtual object in response to determining that the physical article is moving.

20. The method of claim 1, wherein the visual fixation point corresponds to a body-locked virtual object or a world-locked virtual object.

* * * * *